(12) United States Patent
Honda et al.

(10) Patent No.: US 12,525,652 B2
(45) Date of Patent: Jan. 13, 2026

(54) METHOD FOR MANUFACTURING LAMINATED BATTERY

(71) Applicant: Panasonic Intellectual Property Management Co., Ltd., Osaka (JP)

(72) Inventors: Kazuyoshi Honda, Osaka (JP); Akira Kawase, Osaka (JP); Eiichi Koga, Osaka (JP); Kouji Nishida, Osaka (JP); Kazuhiro Morioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 656 days.

(21) Appl. No.: 17/929,772

(22) Filed: Sep. 6, 2022

(65) Prior Publication Data
US 2022/0416309 A1     Dec. 29, 2022

Related U.S. Application Data

(63) Continuation of application No. PCT/JP2021/005398, filed on Feb. 15, 2021.

(30) Foreign Application Priority Data

Mar. 30, 2020  (JP) ................................ 2020-060224

(51) Int. Cl.
*H01M 10/0585* (2010.01)
*G01R 31/389* (2019.01)
(Continued)

(52) U.S. Cl.
CPC ...... *H01M 10/0585* (2013.01); *G01R 31/389* (2019.01); *G01R 31/396* (2019.01); *H01M 10/482* (2013.01)

(58) Field of Classification Search
CPC ......................... G01R 31/3865; G01R 31/387; G01R 31/389; G01R 31/396; H01M 10/052; H01M 10/0525
See application file for complete search history.

(56) References Cited

U.S. PATENT DOCUMENTS

| | | |
|---|---|---|
| 2016/0118646 A1 | 4/2016 | Ikenuma |
| 2018/0342603 A1 | 11/2018 | Saito et al. |
| 2022/0416309 A1* | 12/2022 | Honda ................ H01M 10/482 |

FOREIGN PATENT DOCUMENTS

| | | | | |
|---|---|---|---|---|
| CN | 1768404 A | * | 5/2006 | ............. H01G 11/06 |
| JP | 2011-210588 A | | 10/2011 | |

(Continued)

OTHER PUBLICATIONS

International Search Report of PCT application No. PCT/JP2021/005398 dated Apr. 6, 2021.

(Continued)

*Primary Examiner* — Minh N Trinh
(74) *Attorney, Agent, or Firm* — Greenblum & Bernstein, P.L.C.

(57) ABSTRACT

A method for manufacturing a laminated battery in which a plurality of unit battery cells each having a negative-electrode layer, a positive-electrode layer, and a solid electrolyte layer located between the negative-electrode layer and the positive-electrode layer are laminated, the method including: measuring respective characteristics of the plurality of unit battery cells; laminating the plurality of unit battery cells, the characteristics of the plurality of unit battery cells being measured; and on the basis of the respective characteristics of the plurality of unit battery cells laminated in the laminating, adjusting areas of the plurality of unit battery cells which are laminated by collectively cutting the plurality of unit battery cells which are laminated and thereby so (Continued)

that a battery capacity of the laminated battery falls within a predetermined range of value.

10 Claims, 9 Drawing Sheets

(51) Int. Cl.
    *G01R 31/396*     (2019.01)
    *H01M 10/48*     (2006.01)

(56) References Cited

FOREIGN PATENT DOCUMENTS

| | | |
|---|---|---|
| JP | 2013-200940 | 10/2013 |
| JP | 2016-085965 | 5/2016 |
| JP | 2017-054871 | 3/2017 |
| WO | 2011/158313 | 12/2011 |

OTHER PUBLICATIONS

Office Action dated Mar. 18, 2024, for the related European Patent Application No. 21779696.0.

* cited by examiner

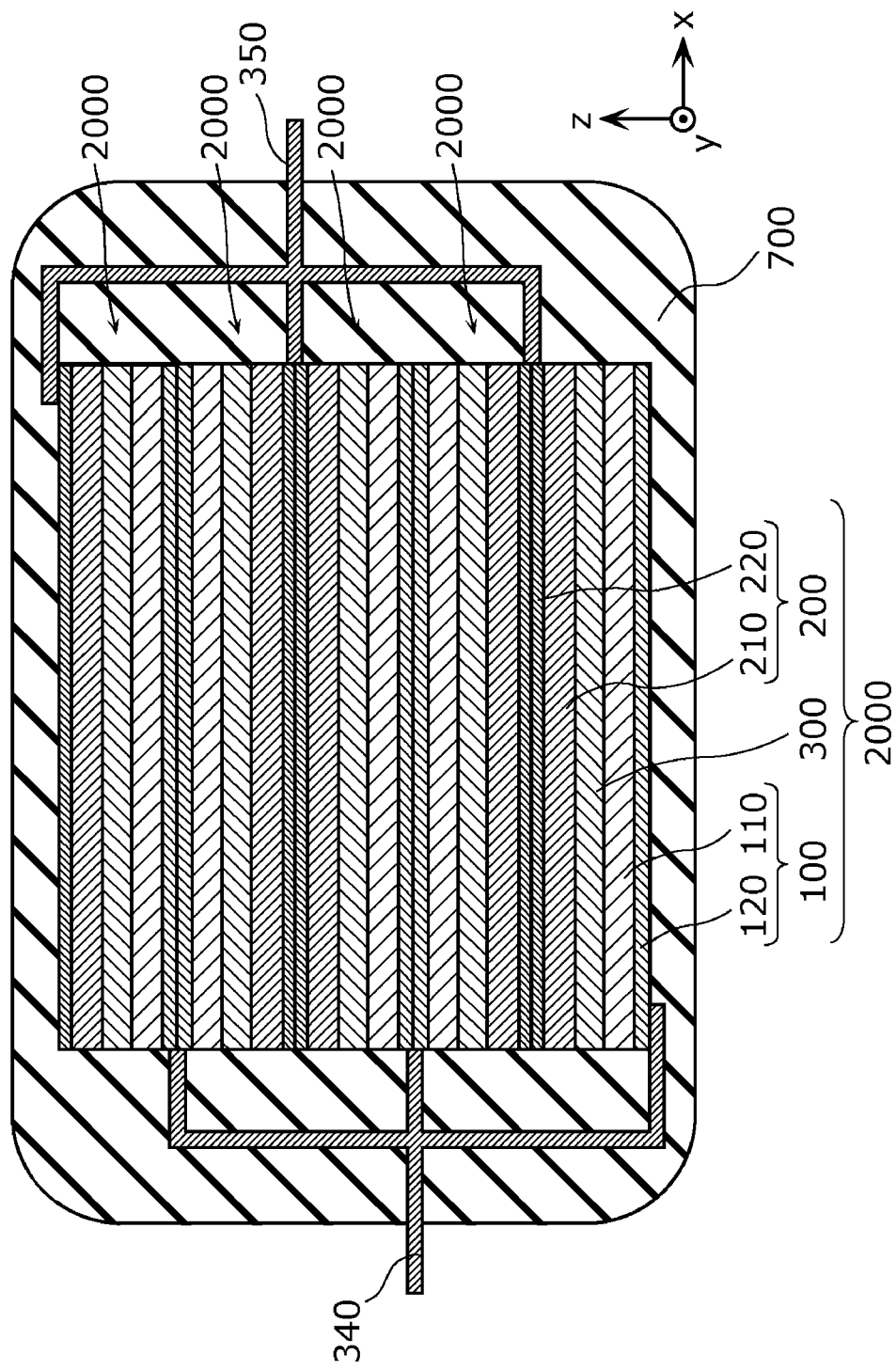

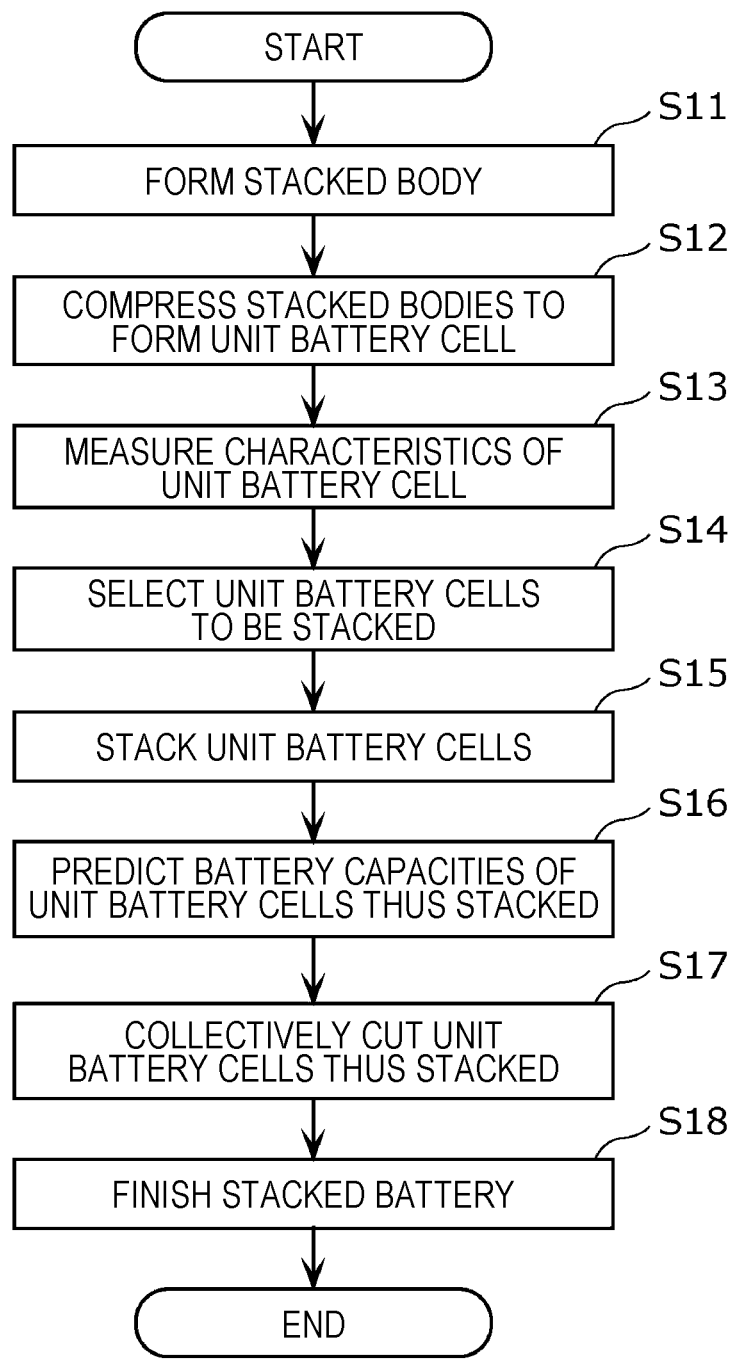

METHOD FOR MANUFACTURING LAMINATED BATTERY

BACKGROUND

1. Technical Field

The present disclosure relates to a method for manufacturing a laminated battery.

2. Description of the Related Art

Japanese Unexamined Patent Application Publication No. 2016-85965 discloses an electric storage device including a series connection of battery cells containing graphene as a conductive auxiliary agent.

Japanese Unexamined Patent Application Publication No. 2017-054871 discloses combining and laminating unit batteries of different battery capacities on the basis of results of measurements of battery capacities and thereby fabricating a cell sheet including a parallel connection of the unit cells thus laminated.

Japanese Unexamined Patent Application Publication No. 2013-200940 discloses applying distributed pressure so that the periphery of a laminated battery is subjected to strong pressure.

SUMMARY

Of the conventional technologies, further improvement in battery capacity precision and reliability of a battery is required.

It is important for a laminated battery too to be high in battery capacity precision in order to give excellent performance with enhanced reliability by preventing over-charge and over-discharge.

Meanwhile, a unit battery cell constituting a laminated battery and containing a solid electrolyte or other components is so thin in thickness as to have a problem with a tendency to suffer from a collapse and an internal crack near a cut surface during cutting and, in the case of a shorter takt time for cutting, remarkably suffers from the cut surface problem.

One non-limiting and exemplary embodiment provides a method for manufacturing a laminated battery that makes it possible to manufacture a laminated battery with enhanced reliability with high producibility.

In one general aspect, the techniques disclosed here feature a method for manufacturing a laminated battery in which a plurality of unit battery cells each having a negative-electrode layer, a positive-electrode layer, and a solid electrolyte layer located between the negative-electrode layer and the positive-electrode layer are laminated, the method including: measuring respective characteristics of the plurality of unit battery cells; laminating the plurality of unit battery cells, the characteristics of the plurality of unit battery cells being measured; and on the basis of the respective characteristics of the plurality of unit battery cells laminated in the laminating, adjusting areas of the plurality of unit battery cells which are laminated by collectively cutting the plurality of unit battery cells which are laminated and thereby so that a battery capacity of the laminated battery falls within a predetermined range of value.

The present disclosure makes it possible to manufacture a laminated battery with enhanced reliability with high producibility.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a cross-sectional view schematically showing a configuration of a laminated battery including a sealing member according to the modification of the embodiment;

FIG. 5 is a flow chart for explaining a method for manufacturing a laminated battery according to the embodiment;

DETAILED DESCRIPTIONS

Figure 1:
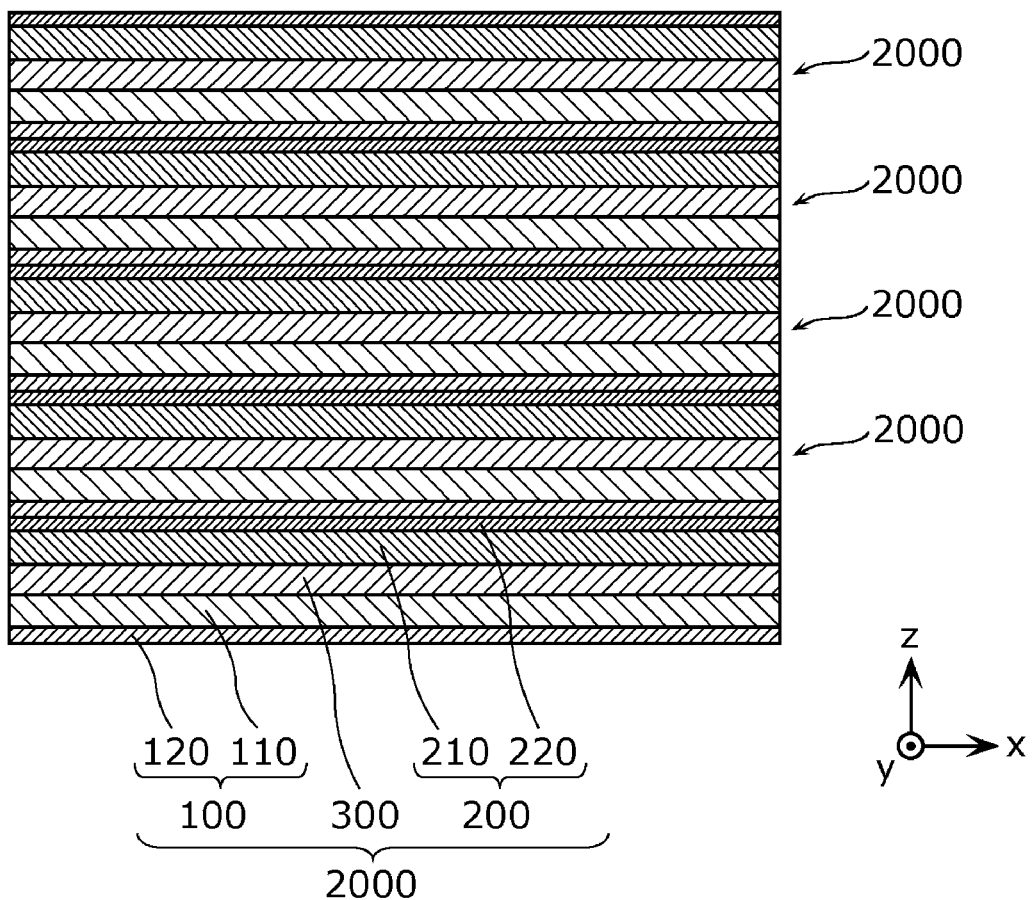
FIG. 1 is a cross-sectional view schematically showing a configuration of a laminated battery according to an embodiment.

Underlying Knowledge Forming Basis of the Present Disclosure

A method for manufacturing a laminated battery according to an aspect of the present disclosure is A method for manufacturing a laminated battery in which a plurality of unit battery cells each having a negative-electrode layer, a positive-electrode layer, and a solid electrolyte layer located between the negative-electrode layer and the positive-electrode layer are laminated, the method including: measuring respective characteristics of the plurality of unit battery cells; laminating the plurality of unit battery cells, the characteristics of the plurality of unit battery cells being measured; and on the basis of the respective characteristics of the plurality of unit battery cells laminated in the laminating, adjusting areas of the plurality of unit battery cells which are laminated by collectively cutting the plurality of unit battery cells which are laminated and thereby so that a battery capacity of the laminated battery falls within a predetermined range of value.

This makes it possible to measure the respective characteristics of the unit battery cells of the laminated battery prior to the laminating and estimate, for example, on the basis of the characteristics thus measured, the battery capacities of the plurality of unit battery cells laminated in the laminating. This in turn makes it possible to precisely adjust the battery capacities by adjusting the area of the laminated battery, which is proportional to the battery capacity of the laminated battery, by collectively cutting the plurality of unit battery cells thus laminated. This in turn makes it possible to increase the battery capacity precision of the laminated battery. Further, in the cutting, the collective cutting of a robust cut body obtained by integration of the plurality of unit battery cells by laminating makes it possible to reduce the occurrence of collapses and internal cracks near a cut surface. This makes it possible to enhance the reliability of the laminated battery. Further, the collective cutting can make the number of cuttings much smaller than the individual cutting of each of the plurality of unit battery cells. This brings about improvement in producibility of the laminated battery.

Further, in a case where cutting is carried out again to adjust the area for the purpose of further adjusting the battery capacity, there tends to be deterioration in cut surface quality, as the amount of adjustment is so small that the ratio of the thickness of the cut body to the cutting width is too high. In the manufacturing method according to the present aspect, a site of cutting of the laminated battery can be accurately determined, as the areas of the plurality of unit battery cells laminated in the laminating are adjusted on the basis of characteristics measured in advance. This results in making it unnecessary to carry out cutting again with a small amount of adjustment, making it possible to improve the cut surface quality of the laminated battery.

Therefore, the method for manufacturing a laminated battery according to the present aspect makes it possible to manufacture a laminated battery with high producibility.

Further, for example, in the measuring, respective charge and discharge characteristics of the plurality of unit battery cells may be measured as the characteristics.

This makes it possible to precisely estimate the battery capacities of the plurality of unit battery cells laminated in the laminating, as the measurement of the charge and discharge characteristics allows quantities of electricity and voltages associated with the battery capacities to be measured.

Further, for example, in the measuring, the charge and discharge characteristics may be measured in a region lower than or equal to 10% of the battery capacities of the plurality of unit battery cells.

This makes it possible to make the duration of measurement of the charge and discharge characteristics shorter than in a fully charged condition, as the charge and discharge characteristics are measured in some regions of the battery capacities of the unit battery cells. Further, even with the charge and discharge characteristics measured in some regions of the battery capacities, the battery capacities of the unit battery cells can be derived, as the amounts of rise in voltage of the unit battery cells with respect to the quantities of charging electricity at an early stage of charging are correlated with the battery capacities. This makes it possible to manufacture the laminated battery with high producibility. Further, since a small quantity of electricity is charged, only a small amount of current flows even at the occurrence of a short circuit or other failures due to contact between a negative-electrode layer and a positive-electrode layer during the manufacture, so that heat generation or other events are reduced. This makes it possible to enhance the safety with which the laminated battery is manufactured.

Further, for example, a duration of measurement of the charge and discharge characteristics may be shorter than or equal to one minute.

This makes it possible to derive the battery capacities of the unit batter cells even when the duration of measurement of the charge and discharge characteristics is short, as the amounts of rise in voltage of the unit battery cells with respect to the quantities of charging electricity at an early stage of charging are correlated with the battery capacities. This makes it possible to manufacture the laminated battery with high producibility.

Further, for example, in the measuring, respective impedances of the plurality of unit battery cells may be measured as the characteristics.

This makes it possible to derive the battery capacities of the unit battery cells simply by measuring the impedances of the unit battery cells, as the impedances and battery capacities of the unit battery cells are correlated with each other. This makes it possible to manufacture the laminated battery with high producibility.

Further, for example, a cutting direction of the collective cutting may be oblique to a direction of laminating of the plurality of unit battery cells.

This makes it possible to increase the distance between the negative-electrode layer and the positive-electrode layer on the cut surface, making it possible to reduce the risk of a short circuit on the cut surface. This makes it possible to manufacture a laminated battery with further enhanced reliability.

The following describes an embodiment of the present disclosure with reference to the drawings.

It should be noted that the embodiments to be described below each illustrate a comprehensive and specific example. The numerical values, shapes, materials, constituent elements, placement and topology of constituent elements, steps, orders of steps, or other features that are shown in the following embodiments are just a few examples and are not intended to limit the present disclosure. Further, those of the constituent elements in the following embodiments which are not recited in an independent claim are described as optional constituent elements.

Further, the drawings are schematic views, and are not necessarily strict illustrations. Accordingly, for example, the drawings are not necessarily to scale. In the drawings, substantially the same components are given the same reference signs, and a repeated description may be omitted or simplified.

Further, terms such as "parallel" used herein to show the way in which elements are interrelated, terms such as "rectangular" used herein to show the shape of an element, and ranges of numerical values used herein are not expressions that represent only exact meanings but expressions that are meant to also encompass substantially equivalent ranges, e.g. differences of approximately several percent.

Further, in the present specification and drawings, the x axis, the y axis, and the z axis represent the three axes of a three-dimensional orthogonal coordinate system. In each of the embodiments, the z-axis direction is a thickness direction of a battery. Further, a positive direction parallel with the z axis is upward in the z-axis direction, and a negative direction parallel with the z axis is downward in the z-axis direction. Further, the term "thickness direction" used herein means a direction parallel with a direction of laminating of a laminated battery and unit battery cells, i.e. a direction perpendicular to a principal surface of each layer.

Further, the term "plan view" used herein means a case where the laminated battery and the unit battery cells are seen from an angle parallel with the thickness direction.

Further, the "areas" of the laminated battery and the unit battery cells herein mean the areas of the laminated battery and the unit battery cells in plan view.

Further, a negative-electrode collector and a positive-electrode collector are sometimes collectively referred to simply as "collectors". Further, a negative-electrode active material layer and a positive-electrode active material layer are sometimes collectively referred to simply as "active material layers".

Embodiment

First, a configuration of a laminated battery according to the present embodiment is described.

FIG. 1 is a cross-sectional view schematically showing a configuration of a laminated battery 1000 according to the present embodiment.

As shown in FIG. 1, the laminated battery 1000 according to the present embodiment includes a plurality of unit battery cells 2000. Specifically, the laminated battery 1000 has a structure in which the plurality of unit battery cells 2000 are laminated. The plurality of unit battery cells 2000 are electrically connected in series to one another to constitute the laminated battery 1000. The laminated battery 1000 is for example a secondary battery that is capable of being repeatedly charged and discharged. In the illustrated example, five unit battery cells 2000 are laminated. However, the number of unit battery cells 2000 that are laminated is not limited to a particular number. The number of unit battery cells 2000 that are laminated may be larger than or equal to 2 and smaller than or equal to 4 or may be larger than or equal to 6.

Each of the unit battery cells 2000 includes a negative-electrode layer 100, a positive-electrode layer 200, and a solid electrolyte layer 300 located between the negative-electrode layer 100 and the positive-electrode layer 200. The plurality of unit battery cells 2000 are laminated such that their electrodes are facing in the same orientation. That is, in the laminated battery 1000, adjacent unit battery cells 2000 are laminated such that the negative-electrode layer 100 of one of the adjacent unit battery cells 2000 and the positive-electrode layer 200 of the other of the adjacent unit battery cells 2000 are adjacent to each other. This causes the laminated battery 1000 to be a series-connected laminated battery in which the plurality of unit battery cells 2000 are electrically connected in series to one another.

The negative-electrode layer 100 and the positive electrode layer 200 face each other across the solid electrolyte layer 300. In the illustrated example, each of the unit battery cells 2000 includes a pair of negative-electrode and positive-electrode layers 100 and 200 facing each other across a solid electrolyte layer 300. However, this is not intended to impose any limitation. Each of the unit battery cells 2000 may include two or more of at least any of the negative-electrode layer 100, the positive-electrode layer 200, and the solid electrolyte layer 300.

In each of the unit battery cells 2000, the negative-electrode layer 100, the solid electrolyte layer 300, and the positive-electrode layer 200 are laminated in this order along a thickness direction (z-axis direction) of the unit battery cell 2000. More specifically, in each of the unit battery cells 2000, a negative-electrode collector 120, a negative-electrode active material layer 110, the solid electrolyte layer 300, a positive-electrode active material layer 210, and a positive-electrode collector 220 are laminated in this order along the thickness direction of the unit battery cell 2000.

The negative-electrode layer 100 includes the negative-electrode active material layer 110 and the negative-electrode collector 120. The negative-electrode active material layer 110 is located between the solid electrolyte layer 300 and the negative-electrode collector 120. The thickness of the negative-electrode active material layer 110 is for example greater than or equal to 5 μm and less than or equal to 300 μm, but is not limited to these values.

The negative-electrode active material layer 110 contains, for example, a negative-electrode active material as an electrode material. Usable examples of the negative-electrode active material contained in the negative-electrode active material layer 110 include negative-electrode active materials such as graphite and metal lithium. As a material of the negative-electrode active material, any of various materials from and into which ions such as lithium (Li) or magnesium (Mg) ions can be desorbed or inserted may be used.

Further, usable examples of the material contained in the negative-electrode active material layer 110 include solid electrolytes such as inorganic solid electrolytes. Usable examples of inorganic solid electrolytes include sulfide solid electrolytes or oxide solid electrolytes. Usable examples of sulfide solid electrolytes include a mixture of lithium sulfide ($Li_2S$) and phosphorus pentasulfide ($P_2S_5$). Further, usable examples of the material contained in the negative-electrode active material layer 110 include conductive agents such as acetylene black, carbon black, graphite, and carbon fiber or binding binders such as polyvinylidene fluoride.

The negative-electrode collector 120 is in contact with the negative-electrode active material layer 110. The thickness of the negative-electrode collector 120 is for example greater than or equal to 5 μm and less than or equal to 100 μm, but is not limited to these values. The negative-electrode collector 120 is a member having electrical conductivity. The negative-electrode collector 120 may for example be a thin film having electrical conductivity. Usable examples of a material that constitutes the negative-electrode collector 120 include metals such as stainless steel (SUS), aluminum (Al), copper (Cu), and nickel (Ni). Specifically, usable examples of the negative-electrode collector 120 include metallic foil such as SUS foil, Cu foil, and Ni foil.

Another layer such as a joining layer constituted by an conductive material may be provided between the negative-electrode active material layer 110 and the negative-electrode collector 120. Further, the negative-electrode layer 100 does not need to include the negative-electrode collector 120, and for example, collectors of adjacent unit battery cells 2000, an extraction electrode, a substrate that supports the laminated battery 1000, or other components may function as a collector of the negative-electrode active material layer 110. That is, the negative-electrode layer 100 may include only the negative-electrode active material layer 110 out of the negative-electrode active material layer 110 and the negative-electrode collector 120.

The positive-electrode layer 200 includes the positive-electrode active material layer 210 and the positive-electrode collector 220. The positive-electrode active material layer 210 is located between the solid electrolyte layer 300 and the positive-electrode collector 220. The thickness of the positive-electrode active material layer 210 is for example greater than or equal to 5 μm and less than or equal to 300 μm, but is not limited to these values.

The positive-electrode active material layer 210 contains, for example, a positive-electrode active material as an electrode material. The positive-electrode active material is a material that constitutes the extreme opposite of the negative-electrode active material.

Usable examples of the positive-electrode active material contained in the positive-electrode active material layer 210 include positive-electrode active materials such as a lithium cobalt oxide complex oxide (LCO), a lithium nickel oxide complex oxide (LNO), a lithium manganese oxide complex oxide (LMO), a lithium-manganese-nickel complex oxide (LMNO), a lithium-manganese-cobalt complex oxide (LMCO), a lithium-nickel-cobalt complex oxide (LNCO), and a lithium-nickel-manganese-cobalt complex oxide (LNMCO).

As a material of the positive-electrode active material, any of various materials from and into which ions such as Li or Mg ions can be desorbed or inserted may be used.

Further, usable examples of the material contained in the positive-electrode active material layer 210 include solid electrolytes such as inorganic solid electrolytes. Usable examples of inorganic solid electrolytes include sulfide solid electrolytes or oxide solid electrolytes. Usable examples of sulfide solid electrolytes include a mixture of lithium sulfide ($Li_2S$) and phosphorus pentasulfide ($P_2S_5$). The positive-electrode active material may have its surface coated with a solid electrolyte. Further, usable examples of the material contained in the positive-electrode active material layer 210 include conductive agents such as acetylene black, carbon black, graphite, and carbon fiber or binding binders such as polyvinylidene fluoride.

The positive-electrode collector 220 is in contact with the positive-electrode active material layer 210. The thickness of the positive-electrode collector 220 is for example greater than or equal to 5 μm and less than or equal to 100 μm, but is not limited to these values. The positive-electrode collector 220 is a member having electrical conductivity. The positive-electrode collector 220 may for example be a thin film having electrical conductivity. Usable examples of a material that constitutes the positive-electrode collector 220 include metals such as stainless steel (SUS), aluminum (Al), copper (Cu), and nickel (Ni). Specifically, usable examples of the positive-electrode collector 220 include metallic foil such as SUS foil, Cu foil, and Ni foil.

Another layer such as a joining layer constituted by an conductive material may be provided between the positive-electrode active material layer 210 and the positive-electrode collector 220. Further, the positive-electrode layer 200 does not need to include the positive-electrode collector 220, and for example, collectors of adjacent unit battery cells 2000, an extraction electrode, a substrate that supports the laminated battery 1000, or other components may function as a collector of the positive-electrode active material layer 210. That is, the positive-electrode layer 200 may include only the positive-electrode active material layer 210 out of the positive-electrode active material layer 210 and the positive-electrode collector 220.

The solid electrolyte layer 300 is disposed between the negative-electrode active material layer 110 and the positive-electrode active material layer 210. The solid electrolyte layer 300 is in contact with each of the negative-electrode and positive-electrode active material layers 110 and 210. The thickness of the solid electrolyte layer 300 may be greater than or equal to 5 μm and less than or equal to 300 μm or may be greater than or equal to 5 μm and less than or equal to 100 μm.

In the present embodiment, the negative-electrode active material layer 110, the positive-electrode active material layer 210, and the solid electrolyte layer 300 are maintained in a parallel plate state. This makes it possible to reduce the occurrence of breaks or collapses due to curving. The negative-electrode active material layer 110, the positive-electrode active material layer 210, and the solid electrolyte layer 300 may be smoothly curved in combination.

The solid electrolyte layer 300 is a layer containing an electrolyte material. As the electrolyte material, a generally known electrolyte for use in a battery may be used. The solid electrolyte layer 300 contains a solid electrolyte as an electrolyte. The unit battery cells 2000 may for example be all-solid batteries.

Usable examples of the solid electrolyte include solid electrolytes such as inorganic solid electrolytes. Usable examples of inorganic solid electrolytes include sulfide solid electrolytes or oxide solid electrolytes. Usable examples of sulfide solid electrolytes include a mixture of lithium sulfide ($Li_2S$) and phosphorus pentasulfide ($P_2S_5$). The solid electrolyte layer 300 may contain a binding binder such as polyvinylidene fluoride in addition to the electrolyte material.

The laminated battery 1000 is constituted, for example, by the unit battery cells 2000 being integrated by bonding, joining, or other processes. Further, the laminated battery 1000 has a side end face (i.e. an end face facing in a direction perpendicular to the direction of laminating) formed by collectively cutting, along the direction of laminating, all of the plurality of unit battery cells 2000 thus laminated. This causes areas to be adjusted so that the battery capacity of the laminated battery 1000 falls within a predetermined range of value. A method for adjusting the areas so that the battery capacity falls within the predetermined range of value will be described later.

Figure 2:
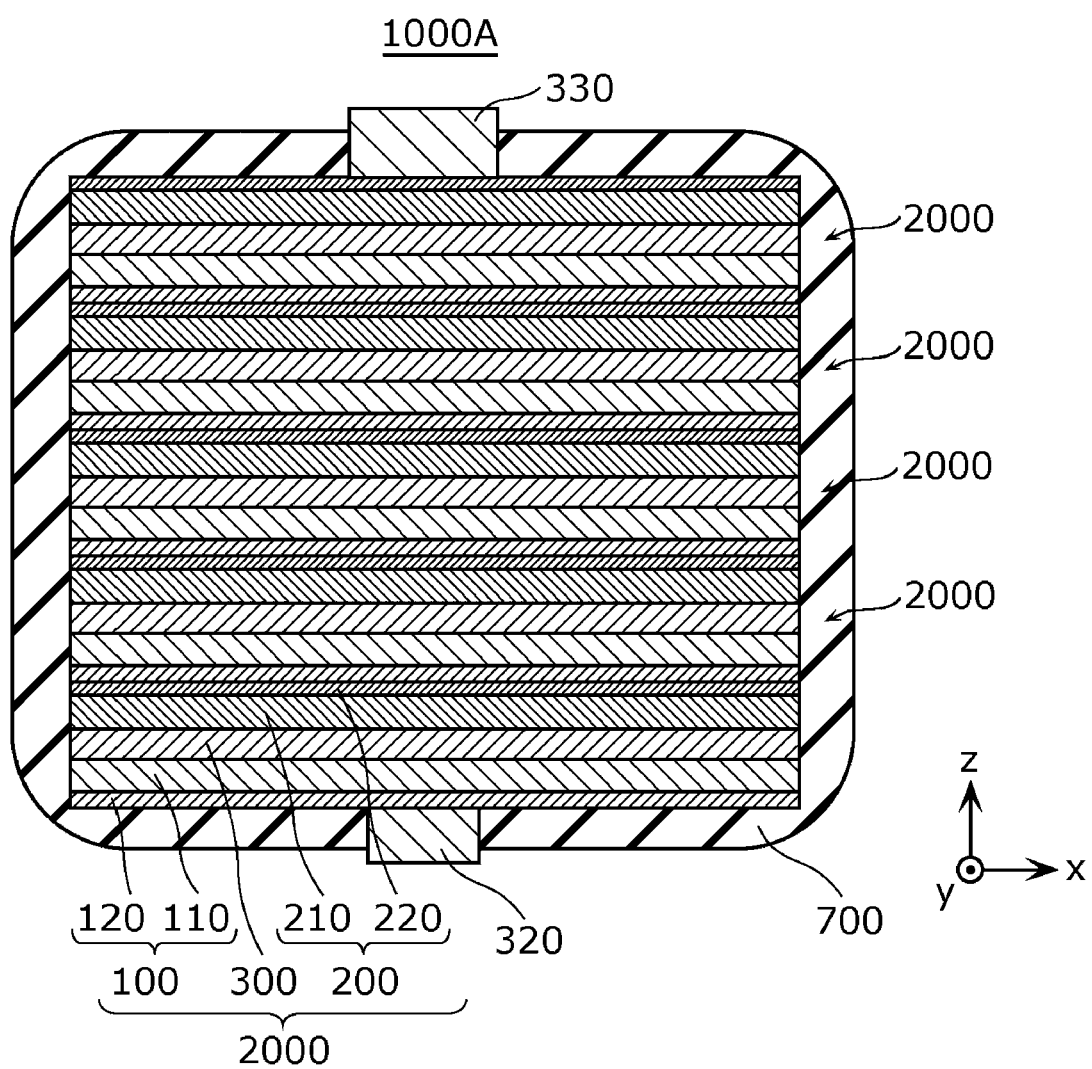
FIG. 2 is a cross-sectional view schematically showing a configuration of a laminated battery including a sealing member according to the embodiment.

Further, the laminated battery according to the present embodiment may further include a sealing member. FIG. 2 is a cross-sectional view schematically showing a configuration of a laminated battery 1000A including a sealing member 700 according to the present embodiment. As shown in FIG. 2, the laminated battery 1000A includes the sealing member 700, a negative-electrode collecting lead 320, and a positive-electrode collecting lead 330 in addition to the components of the aforementioned laminated battery 1000.

The negative-electrode collecting lead 320 and the positive-electrode collecting lead 330 are terminals, connected to the negative-electrode and positive-electrode collectors 120 and 220 of unit battery cells 2000 at both ends in the direction of laminating, respectively, through which a current is extracted from the laminated battery 1000A. Usable examples of a material that constitutes the negative-electrode collecting lead 320 and the positive-electrode collecting lead 330 include metals such as nickel, stainless steel, aluminum, and copper.

The sealing member 700 is disposed to cover all of the plurality of unit battery cells 2000 laminated. Parts of the negative-electrode collecting lead 320 and the positive-electrode collecting lead 330 are exposed without being covered with the sealing member 700. The sealing member 700 is made, for example, of an electrical insulating material.

For example, the sealing member 700 is a member containing a first material. The sealing member 700 may for example be a member containing the first material as a major ingredient. The sealing member 700 may for example be a member composed solely of the first material.

Usable examples of the first material include generally known battery sealing member materials such as sealants. Usable examples of the first material include resin materials. The first material may be an insulating material having no ion conductivity. For example, the first material may be at least one type of epoxy resin, acrylic resin, polyimide resin, and silsesquioxane.

The sealing member 700 may contain a particulate metal oxide material. Usable examples of the metal oxide material include silicon oxide, aluminum oxide, titanium oxide, zinc oxide, cerium oxide, ferric oxide, tungsten oxide, zirconium oxide, calcium oxide, zeolite, and glass. For example, the sealing member 700 may be made of a resin material containing a dispersion of a plurality of particles made of a metal oxide material.

The disposition of the sealing member 700 makes it possible to improve the reliability of the laminated battery 1000A in various respects such as mechanical strength, short-circuit prevention, and moisture prevention.

Modification

Next, a modification of the embodiment is described. The following description gives a description with a focus on differences from the foregoing embodiment and omits or simplifies a description of common features as appropriate.

Figure 3:
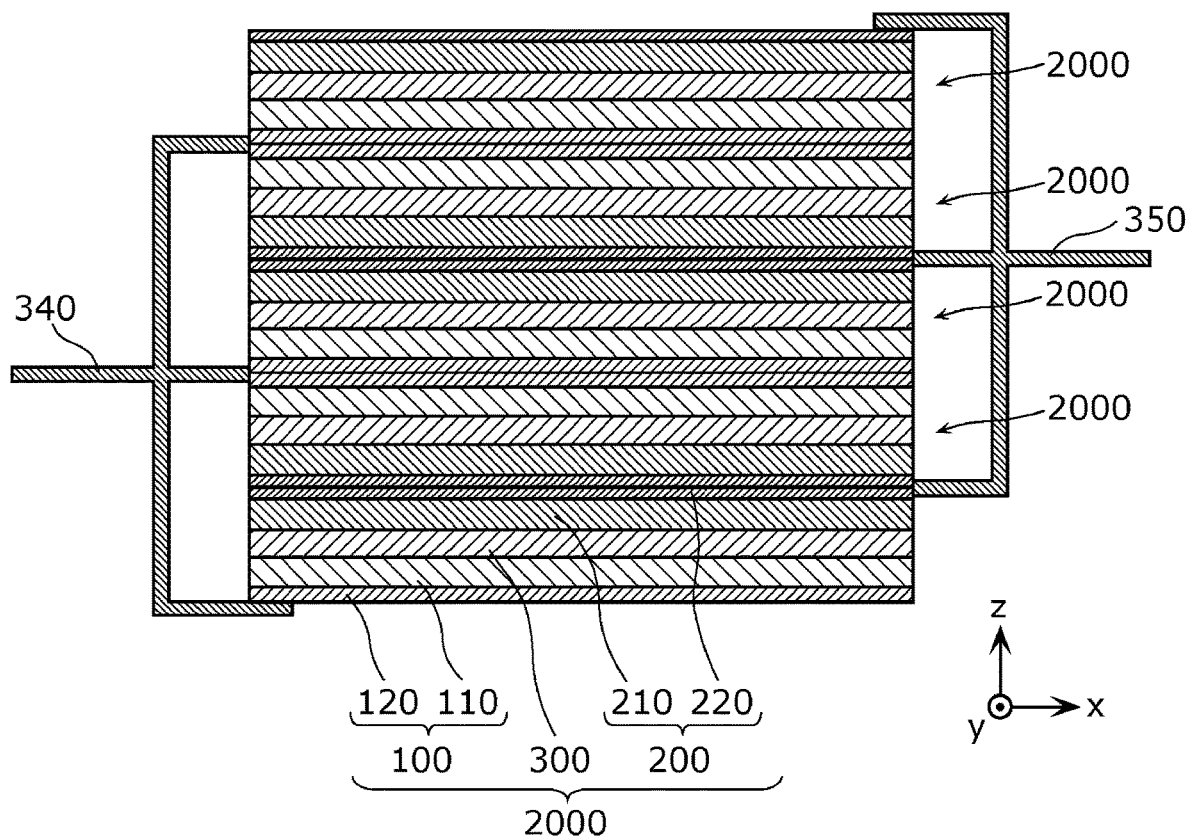
FIG. 3 is a cross-sectional view schematically showing a configuration of a laminated battery according to a modification of the embodiment.

FIG. 3 is a cross-sectional view schematically showing a configuration of a laminated battery 1100 according to the present modification. The laminated battery 1100 differs from the laminated battery 1000 according to the embodiment in that a plurality of unit battery cells 2000 are electrically connected in parallel to one another.

As shown in FIG. 3, the laminated battery 1100 according to the present modification includes the plurality of unit battery cells 2000. Specifically, the laminated battery 1100 has a structure in which the plurality of unit battery cells 2000 are laminated. The plurality of unit battery cells 2000 are electrically connected in parallel to one another to constitute the laminated battery 1100. Further, the laminated battery 1100 includes a negative-electrode collecting lead 340 and a positive-electrode collecting lead 350.

Adjacent ones of the plurality of unit battery cells 2000 are laminated with their electrodes in inverted orientation. That is, in the laminated battery 1100, the plurality of unit battery cells 2000 are laminated such that the negative-electrode or positive-electrode layers 100 or 200 of two adjacent unit battery cells 2000 are adjacent to each other. This causes the laminated battery 1100 to be a parallel-connected laminated battery in which the plurality of unit battery cells 2000 are electrically connected in parallel to one another.

In each of the unit battery cells 2000, the negative-electrode layer 100, the solid electrolyte layer 300, and the positive-electrode layer 200 are alternately laminated in this order or reverse order along a thickness direction (z-axis direction) of the unit battery cell 2000.

The negative-electrode collecting lead 340 and the positive-electrode collecting lead 350 are conducting wires that are used for charge and discharge, inter-terminal voltage monitoring, or other purposes. The negative-electrode collecting lead 340 is electrically connected to the negative-electrode collector 120 of the negative-electrode layer 100 of each of the plurality of unit battery cells 2000. The positive-electrode collecting lead 350 is electrically connected to the positive-electrode collector 220 of the positive-electrode layer 200 of each of the plurality of unit battery cells 2000.

The laminated battery 1100 shown in FIG. 3 is constituted, for example, by the unit battery cells 2000 being integrated by bonding, joining, or other processes. Further, the laminated battery 1100 has a side end face (i.e. an end face facing in a direction perpendicular to the direction of laminating) formed by collectively cutting, along the direction of laminating, all of the plurality of unit battery cells 2000 thus laminated. This causes areas to be adjusted so that the battery capacity of the laminated battery 1100 falls within a predetermined range of value. The method for adjusting the areas so that the battery capacity falls within the predetermined range of value will be described later.

Further, the laminated battery according to the present modification may further include a sealing member. FIG. 4 is a cross-sectional view schematically showing a configuration of a laminated battery 1100A including a sealing member 700 according to the present modification. As shown in FIG. 4, the laminated battery 1100A includes the sealing member 700 in addition to the components of the aforementioned laminated battery 1100.

The sealing member 700 is disposed to cover all of the plurality of unit battery cells 2000 laminated. Parts of the negative-electrode collecting lead 340 and the positive-electrode collecting lead 350 are exposed without being covered with the sealing member 700.

The disposition of the sealing member 700 brings about effects which are similar to those of the aforementioned laminated battery 1000A.

Method for Manufacturing Laminated Battery

Next, a method for manufacturing a laminated battery according to the present embodiment is described. Although the following mainly describes a method for manufacturing a laminated battery 1000, a laminated battery 1100 too can be manufactured in a similar manner.

The method for manufacturing a laminated battery according to the present embodiment includes a laminated body forming step, a compressing step, a measuring step, a selecting step, a laminating step, and a cutting step. The following describes each of the steps in detail. FIG. 5 is a flow chart for explaining the method for manufacturing a laminated battery according to the present embodiment. It should be noted that the manufacturing method in the following description of the steps is just an example and is not limited to the following method.

(1) Laminated Body Forming Step

First, the laminated body forming step is described. In the method for manufacturing a laminated battery according to the present embodiment, the laminated body forming step is executed first. In the laminated body forming step, layers of material that constitute a unit battery cell 2000 are laminated to form a laminated body (step S11 of FIG. 5).

Figure 6A:
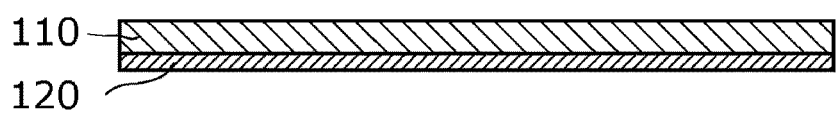
FIG. 6A is a cross-sectional view showing an example of a laminated configuration of a laminated body formed in a laminated body forming step according to the embodiment.
Figure 6B:
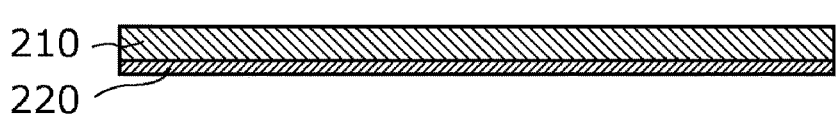
FIG. 6B is a cross-sectional view showing an example of a laminated configuration of a laminated body formed in the laminated body forming step according to the embodiment.

FIGS. 6A to 6H are cross-sectional views each showing an example of a laminated configuration of a laminated body formed in the laminated body forming step. In the laminated body forming step, for example, as shown in FIGS. 6A and 6B, a laminated body in which a negative-electrode active material layer 110 is laminated on top of a negative-electrode collector 120 and a laminated body in which a positive-electrode active material layer 210 is laminated on top of a positive-electrode collector 220 are formed.

Figure 6C:
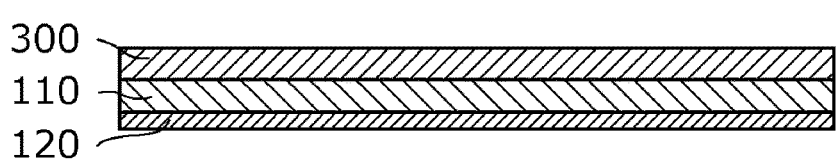
FIG. 6C is a cross-sectional view showing an example of a laminated configuration of a laminated body formed in the laminated body forming step according to the embodiment.
Figure 6D:
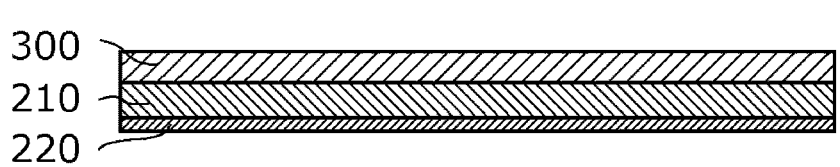
FIG. 6D is a cross-sectional view showing an example of a laminated configuration of a laminated body formed in the laminated body forming step according to the embodiment.

Further, as shown in FIGS. 6C and 6D, a laminated body in which a solid electrolyte layer 300 is laminated on top of the negative-electrode active material layer 110 of the laminated body shown in FIG. 6A and a laminated body in which a solid electrolyte layer 300 is laminated on top of the positive-electrode active material layer 210 of the laminated body shown in FIG. 6B may be formed.

Figure 6E:
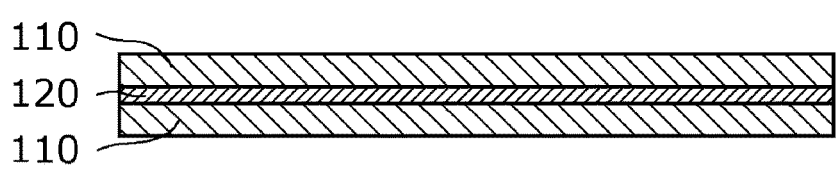
FIG. 6E is a cross-sectional view showing an example of a laminated configuration of a laminated body formed in the laminated body forming step according to the embodiment.
Figure 6F:
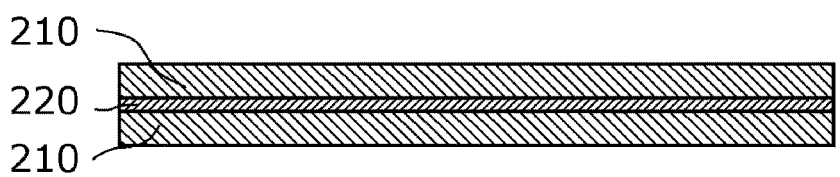
FIG. 6F is a cross-sectional view showing an example of a laminated configuration of a laminated body formed in the laminated body forming step according to the embodiment.

Further, as shown in FIGS. 6E and 6F, a laminated body in which negative-electrode active material layers 110 are laminated on both sides of a negative-electrode collector 120 and a laminated body in which positive-electrode active material layers 210 are laminated on both sides of a positive-electrode collector 220 may be formed.

Figure 6G:
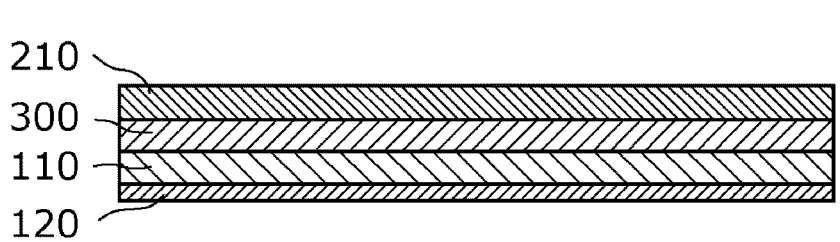
FIG. 6G is a cross-sectional view showing an example of a laminated configuration of a laminated body formed in the laminated body forming step according to the embodiment.
Figure 6H:
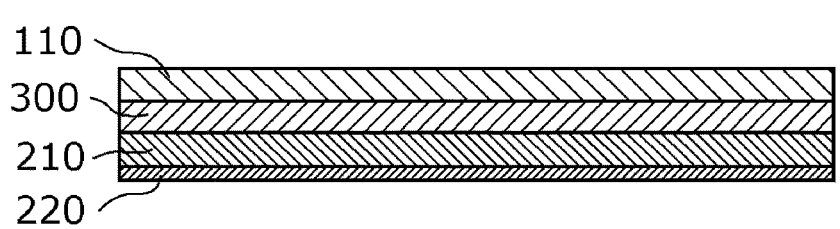
FIG. 6H is a cross-sectional view showing an example of a laminated configuration of a laminated body formed in the laminated body forming step according to the embodiment.

Further, as shown in FIG. 6G, a laminated body in which a positive-electrode active material layer 210 is laminated on top of the solid electrolyte layer 300 of the laminated body shown in FIG. 6C may be formed. Further, as shown in FIG. 6H, a laminated body in which a negative-electrode active material layer 110 is laminated on top of the solid electrolyte layer 300 of the laminated body shown in FIG. 6D may be formed. It should be noted that the laminated bodies shown in FIGS. 6A to 6H are just a few examples and the laminated configuration of a laminated body is not limited to the examples shown in FIGS. 6A to 6H. For example, a laminated body may be identical in laminated configuration to a unit battery cell 2000.

The aforementioned laminated bodies may each be formed, for example, by coating a collector or a surface of each layer with a paste of paint containing a mixture of the respective materials of the negative-electrode active material layer 110, the positive-electrode active material layer 210, and the solid electrolyte layer 300 and a solvent and drying the paste of paint. Further, the laminated bodies thus formed may be compressed in the direction of laminating.

The compression is not limited to particular methods. Plate pressing, roller pressing, pneumatic or gas-pressure bag pressing, hydrostatic pressing, or other various methods may be applied.

(2) Compressing Step

Next, the compressing step is described. In the compressing step, laminated bodies formed in the laminated body forming step are combined on an as-needed basis and compressed to form a unit battery cell 2000 (step S12 of FIG. 5).

In the compressing step, for example, at least two of the laminated bodies shown in FIGS. 6A to 6H are laminated such that the negative-electrode active material layer 110 and the positive-electrode active material layer 210 face each other across the solid electrolyte layer 300. In so doing, the at least two laminated bodies are laminated with any of the negative-electrode active material layer 110, the solid electrolyte layer 300, and the positive-electrode active material layer 210 and any of the negative-electrode active material layer 110, the solid electrolyte layer 300, and the positive-electrode active material layer 210 facing each other, and the laminated bodies are joined to each other by compressing them in the direction of laminating. Further, in a case where the laminated bodies include all layers of a unit battery cell 2000, the laminated bodies may be compressed in the direction of laminating without being combined with each other. In this way, for example, a unit battery cell 2000 is formed.

Figure 7A:
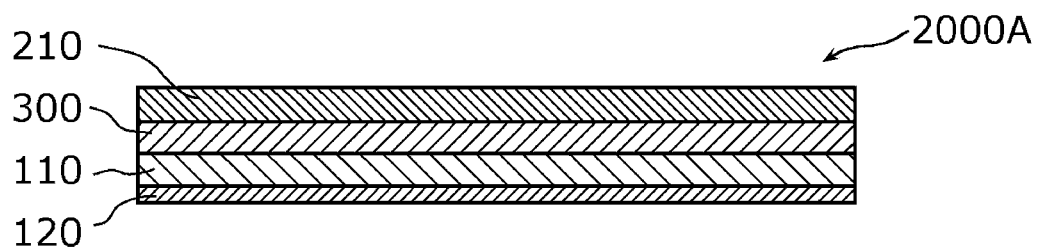
FIG. 7A is a cross-sectional view showing an example of a laminated configuration of a unit battery cell formed in a compressing step according to the embodiment.
Figure 7B:
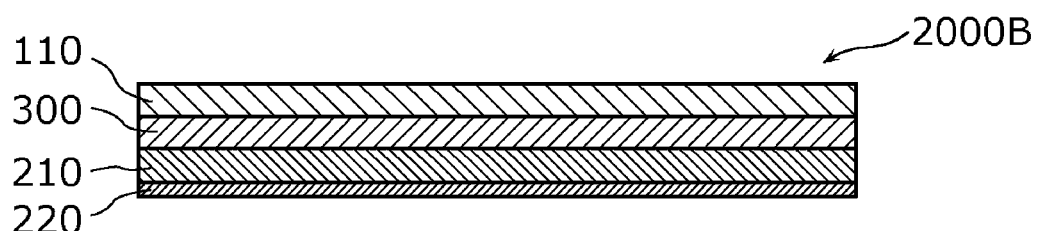
FIG. 7B is a cross-sectional view showing an example of a laminated configuration of a unit battery cell formed in the compressing step according to the embodiment.
Figure 7C:
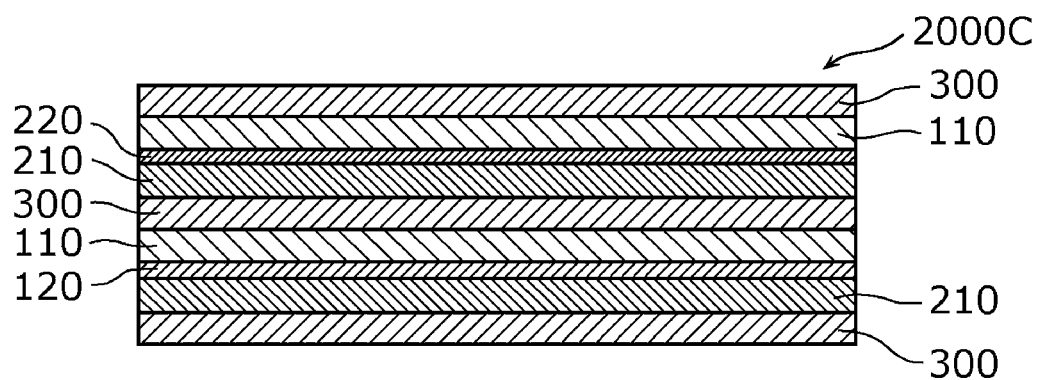
FIG. 7C is a cross-sectional view showing an example of a laminated configuration of a unit battery cell formed in the compressing step according to the embodiment.

It should be noted that the laminated configuration of a laminated battery cell that is formed in the compressing step is not limited to the laminated configuration of a unit battery cell 2000. FIGS. 7A to 7C are cross-sectional views each showing an example of a laminated configuration of a unit battery cell formed in the compressing step according to the embodiment. As shown in FIGS. 7A and 7B, in a case where the laminated bodies shown in FIGS. 6G and 6H are used, the laminated bodies may be compressed in the direction of laminating without being combined with another particular laminated body to form a unit battery cell 2000A or 2000B constituted by a negative-electrode active material layer 110, a solid electrolyte layer 300, and either a positive-electrode active material layer 210 and a negative-electrode collector 120 or a positive-electrode active material layer 210 and a positive-electrode collector 220. Further, as shown in FIG. 7C, a unit battery cell 2000C configured such that active material layers are laminated on both sides of each of two collectors and solid electrolyte layers 300 are laminated on sides of the active material layers opposite to the collectors may be formed. Further, either of the solid electrolyte layers 300 located at both ends of the unit battery cell 2000C in the direction of laminating does not need to be laminated. Further, the unit battery cells shown in FIGS. 7A to 7C are just a few example, and the laminated configuration of a unit battery cell is not limited to the examples shown in FIGS. 7A to 7C.

The compression in the compressing step is not limited to particular methods. Plate pressing, roller pressing, pneumatic or gas-pressure bag pressing, hydrostatic pressing, or other various methods may be applied.

In the laminated body forming step and the compressing step, for example, as many unit battery cells 2000 as needed for the laminated battery 1000 are formed. Further, for example, a plurality of unit battery cells 2000 designed to be identical in material and shape to one another are formed.

In the present embodiment, there is no particular limit on how a unit battery cell 2000 is formed, provided a unit battery cell 2000 that constitutes a laminated battery is formed. A unit battery cell 2000 may be formed by a step other than the aforementioned two steps.

(3) Measuring Step

Next, the measuring step is described. In the measuring step, the respective characteristics of the plurality of unit battery cells 2000 formed in the compressing step are measured (step S13 of FIG. 5). Specifically, in the measuring step, characteristics for deriving the respective battery capacities of the plurality of unit battery cells 2000 are measured. That is, the respective battery capacities of the plurality of unit battery cells 2000 are derived on the basis of the respective characteristics of the plurality of unit battery cells 2000 measured. The battery capacities are quantities of electricity in a fully charged condition.

In the measuring step, for example, the electrical characteristics of electrical behavior such as charge and discharge characteristics are measured as the characteristics. Further, in the measuring step, the mechanical characteristics of, for example, mechanical behavior during compression may be measured as the characteristics. For example, as the electrical characteristics, the battery capacities of the unit battery cells 2000 may be directly derived by measuring the charge and discharge characteristics in a fully charged condition, or the battery capacities of the unit battery cells 2000 may be derived by measuring electrical or mechanical characteristics correlated with the battery capacities and estimating the battery capacities.

The measurement of the electrical characteristics of electrical behavior can involve the use of, for example, impedance measurement, charge and discharge characteristics measurement, or other measurements. That is, in the measuring step, the respective impedances or charge and discharge characteristics of the plurality of unit battery cells 2000 may be measured as the characteristics.

In the impedance measurement, the impedance of a unit battery cell 2000 having a higher battery capacity tends to be lower. Further, progress in compression joining of a unit battery cell 2000 leads to an increase in battery capacity of the unit battery cell 2000 and leads to a decrease in impedance of the unit battery cell 2000. This is used to estimate the battery capacity of a unit battery cell 2000 by measuring the impedance.

For example, a plurality of test unit battery cells of different battery capacities are prepared by preparing a plurality of test unit battery cells of different degrees of progress in compression joining. As the test unit battery cells, unit battery cells that are identical in material and laminated configuration to unit battery cells that constitute a laminated battery to be manufactured are prepared. Then, a correlation between battery capacity and impedance is acquired by measuring the battery capacity and impedance of each of the plurality of test unit battery cells thus prepared. This makes it possible to, by measuring the impedances of the unit battery cells 2000 in the measuring step, estimate the degrees of progress in compression joining and battery capacities of the unit battery cells 2000 from the impedances thus measured and the correlation thus acquired and derive the battery capacities of the unit battery cells 2000. This makes it possible to manufacture the laminated battery 1000 with high producibility, as the battery capacities of the unit battery cells 2000 can be derived simply by measuring the impedances of the unit battery cells 2000.

It should be noted that the aforementioned method is not the only method for preparing test unit battery cells of different battery capacities. For example, a plurality of test unit battery cells of different battery capacities may be prepared by preparing a plurality of unit battery cells made of the same material with varying areas or thicknesses.

In the measurement of the charge and discharge characteristics, the battery capacities are derived from the quantities of charging and discharging electricity, for example, by measuring the charge and discharge characteristics with the unit battery cells 2000 fully charged.

Figure 8:
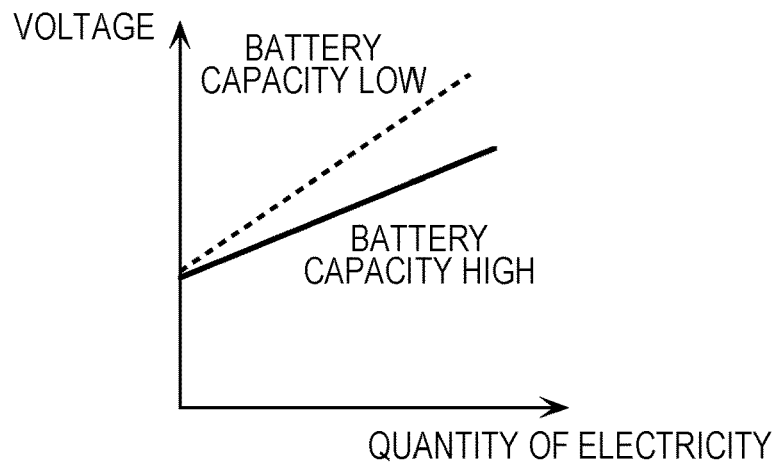
FIG. 8 is a schematic view showing a relationship between quantity of charging electricity and voltage at an early stage of charging of a unit battery cell according to the embodiment.

Further, the charge and discharge characteristics may be measured by measuring the rising characteristics of voltage of the unit battery cells 2000 with respect to the quantities of charging electricity at an early stage of charging where the unit battery cells 2000 are charged with a constant current (i.e. at a constant charge and discharge rate). In such measurement too, the battery capacities can be estimated. FIG. 8 is a schematic view showing a relationship between quantity of charging electricity and voltage at an early stage of charging of a unit battery cell 2000. FIG. 8 shows the voltage (vertical axis) and the quantity of charging electricity (horizontal axis) in a case where the unit battery cell 2000 is charged with a constant current. In FIG. 8, the dotted line indicates a case where the battery capacity of the unit battery cell 2000 is relatively low, and the solid line indicates a case where the battery capacity of the unit battery cell 2000 is relatively high. As shown in FIG. 8, in a case where the battery capacity of the unit battery cell 2000 is low, the rise in voltage at the early stage of charging is large, and in a case where the battery capacity of the unit battery cell 2000 is high, the rise in voltage at the early stage of charging is small. That is, in the case of unit battery cells 2000 that are similar or identical in material and shape, a unit battery cell 2000 with a larger rise in voltage in a short time of approximately several seconds to several minutes after an early stage of charging where the unit battery cell 2000 is charged with a constant current exhibits a correlation with a lower battery capacity in a fully charged condition. This is used to estimate the battery capacity of a unit battery cell 2000 through the short-time charge and discharge characteristics measurement.

For example, as in the case of the aforementioned impedance measurement, a plurality of test unit battery cells of different battery capacities are prepared. Then, a correlation between battery capacity and amount of short-time rise in voltage per unit time is acquired by measuring the battery capacity and amount of short-time rise in voltage per unit time of each of the plurality of test unit battery cells thus prepared. This makes it possible to, by measuring the short-time charge and discharge characteristics of the unit battery cells 2000, estimate the degrees of progress in compression joining and battery capacities of the unit battery cells 2000 from the amounts of rise in per unit time thus measured and the correlation thus acquired and derive the battery capacities of the unit battery cells 2000. This makes it possible to predict the battery capacities of the unit battery cells 2000 even in a short time, thus allowing a rapid shift to a next step in manufacturing a laminated battery. This makes it possible to manufacture the laminated battery 1000 with high producibility. Further, since a small quantity of electricity is charged, only a small amount of current flows even at the occurrence of a short circuit or other failures due to contact between a negative-electrode layer 100 and a positive-electrode layer 200 during the manufacture, so that heat generation or other events are reduced. This makes it possible to enhance the safety with which the laminated battery 1000 is manufactured.

Further, in the acquisition of a correlation between battery capacity and amount of short-time rise in voltage per unit time, correlations at different charge and discharge rates may be acquired by measuring the charge and discharge characteristics of a plurality of test unit battery cells under a plurality of conditions with different charge and discharge rates (i.e. amounts of current during charging and discharging). From among the charge and discharge rates thus measured, a charge and discharge rate most suitable for the measurement of the charge and discharge characteristics may be chosen from the point of view of correlativity, the duration of measurement, or other conditions. Further, for higher accuracy of estimate of the battery capacities of the unit battery cells 2000, the charge and discharge characteristics of the unit battery cells 2000 may be measured at a plurality of charge and discharge rates.

In the short-time charge and discharge characteristics measurement, for example, the charge and discharge characteristics are measured in a region lower than or equal to 10% of the battery capacities of the plurality of unit battery cells 2000. From the point of view of carrying out a measurement in a shorter time, the charge and discharge characteristics may be measured in a region lower than or equal to 5%, 2%, or 1% of the battery capacities of the plurality of unit battery cells 2000. Further, from the point of view of being able to manufacture the laminated battery 1000 with high producibility, the duration of measurement of the charge and discharge characteristics is for example shorter than or equal to one minute. Further, from the point of view of being able to manufacture the laminated battery 1000 with higher producibility, the duration of measurement of the charge and discharge characteristics may be shorter than or equal to thirty seconds, shorter than or equal to ten seconds, or shorter than or equal to three seconds.

Further, in the short-time charge and discharge characteristics measurement, a discharge may be made after the amount of rise in voltage at the early stage of charging has been checked. Further, in a case where the charge and discharge characteristics are measured in a short time, it is possible to proceed to a next manufacturing step without making a discharge, as only a small amount of current flows even if no discharge is made after charging. Further, in a case where a discharge is made, the amount of drop in voltage due to the discharge may be checked.

Examples of the measurement of the mechanical characteristics include the measurement of mechanical deformation amounts, densities, hardness, or other characteristics. As mentioned above, progress in compression joining of a unit battery cell 2000 leads to an increase in battery capacity of the unit battery cell 2000. Therefore, the battery capacities of the unit battery cells 2000 can be estimated by measuring mechanical deformation amounts, densities, hardness, or other characteristics as mechanical characteristics that make it possible to check the degrees of progress in compression joining of the unit battery cells 2000. For example, increases in mechanical deformation amount, density, and hardness lead to increases in battery capacity of the unit battery cells.

(4) Selecting Step

Next, the selecting step is described. In the selecting step, unit battery cells 2000 to be used in the subsequent laminating step are selected from among the plurality of unit battery cells 2000 thus formed on the basis of the respective characteristics of the plurality of unit battery cells 2000 as measured in the measuring step (step S14 of FIG. 5). Specifically, unit battery cells 2000 to be used in the subsequent laminating step are selected from among the plurality of unit battery cells 2000 thus formed on the basis of battery capacities derived from the respective characteristics of the plurality of unit battery cells 2000 as measured in the measuring step. For example, unit battery cells 2000 whose battery capacities fall within the predetermined range of value are selected from among the plurality of unit battery cells 2000 thus formed.

For example, in the manufacture of the series-connected laminated battery 1000, the predetermined range of value is a range greater than or equal to the design values of battery capacity of the plurality of unit battery cells 2000 of the laminated battery 1000. This prevents the laminated battery 1000 from including a low-battery-capacity unit battery cell 2000 that tends to suffer from degradation, heat generation, or other problems due to over-charge or over-discharge, thus making it possible to enhance the reliability of the laminated battery 1000.

Further, for example, in the manufacture of the parallel-connected laminated battery 1100, the predetermined range of value is such a range that variations in the battery capacity of the plurality of unit battery cells 2000 are equal to or lower than a certain level. For example, the difference in battery capacity between each of the plurality of unit battery cells 2000 to be selected and the other is for example less than or equal to 5%, may be less than or equal to 3%, or may be less than or equal to 1%. This makes it possible to reduce variations in current flowing through collecting leads through which a current is extracted from electrodes, thus making it possible to reduce local heat generation of the unit battery cells attributed to an excessive rise in temperature or other factors. This makes it possible to enhance the reliability of the laminated battery 1100. In the manufacture of the series-connected laminated battery 1000 too, the predetermined range of value may be such a range that variations in the battery capacity of the plurality of unit battery cells 2000 are equal to or lower than a certain level. This inhibits degradation, heat generation, or other problems from occurring due to over-charge or over-discharge of the unit batter cells 2000, making it possible to enhance the reliability of the laminated battery 1100.

(5) Laminating Step

Next, the laminating step is described. In the laminating step, the plurality of unit battery cells 2000, selected in the selecting step, the characteristics of which have been measured in the measuring step are laminated (step S15 of FIG. 5). In the manufacturing method according to the present embodiment, the laminating step may be executed without executing the selecting step. The unit battery cells 2000 the characteristics of which have been measured in the measuring step may be used in the laminating step without being particularly selected.

In the laminating step, in a case where as in the case of a unit battery cell 2000, collectors are disposed at both ends of a unit battery cell in the direction of laminating, the plurality of unit battery cells 2000 are laminated such that their collectors face each other. In the case of manufacture of the series-connected laminated battery 1000, adjacent unit battery cells 2000 are laminated such that the negative-electrode collector 120 of one of the adjacent unit battery cells 2000 and the positive-electrode collector 220 of the other of the adjacent unit battery cells 2000 face each other. That is, the plurality of unit battery cells 2000 are laminated such that the negative-electrode layer 100 of one of adjacent unit battery cells 2000 and the positive-electrode layer 200 of the other of the adjacent unit battery cells 2000 are adjacent to each other. Further, in the case of manufacture of the parallel-connected laminated battery 1100, adjacent unit battery cells 2000 are laminated such that the negative-electrode or positive-electrode collectors 120 or 220 of the adjacent unit battery cells 2000 face each other. That is, the plurality of unit battery cells 2000 are laminated such that the negative-electrode or positive-electrode layers 100 or 200 of two adjacent unit battery cells 2000 are adjacent to each other.

Further, for example, adjacent unit battery cells 2000 may be laminated with an conductive material sandwiched therebetween so that their collectors are electrically connected to each other. Usable examples of the conductive material include metal, conductive resin, and conductive adhesive. In a case where adjacent unit battery cells 2000 are joined by an conductive material, a stronger laminated structure of unit battery cells 2000 can be formed.

Further, integration of the plurality of unit battery cells 2000 by laminating forms a robust and thick laminated structure of the plurality of unit battery cells 2000 with a reduction in the occurrence of collapses and internal cracks near a cut surface during collective cutting in the subsequent cutting step.

Further, in the laminating step, in a case where as in the case of the unit battery cells 2000A and 2000B shown in FIGS. 7A and 7B, a collector and an active material layer are disposed at both ends of a unit battery cell in the direction of laminating, adjacent unit battery cells may be laminated such that the active material layer of one of the adjacent unit battery cells and the collector of the other of the adjacent unit battery cells face each other.

Further, in the laminating step, in a case where as in the case of the unit battery cell 2000C shown in FIG. 7C, solid electrolyte layers 300 are disposed at both ends of a unit battery cell in the direction of laminating or a solid electrolyte layer 300 and an active material layer are disposed at both ends, adjacent unit battery cells may be laminated such that the solid electrolyte layer 300 of one of the adjacent unit battery cells and the active material layer or solid electrolyte layer 300 of the other of the adjacent unit battery cells face each other.

A laminated battery can also be manufactured by laminating such unit battery cells 2000A, 2000B, or 2000C and further laminating missing collectors or active material layers as needed.

(6) Cutting Step

Next, the cutting step is described. In the cutting step, first, the battery capacities of the plurality of unit battery cells 2000 laminated in the laminating step are predicted on the basis of the respective characteristics of the plurality of unit battery cells 2000 as measured in the measuring step (step S16 of FIG. 5). Then, on the basis of the battery capacities predicted in step S16, the plurality of unit battery cells 2000 thus laminated are collectively cut, whereby the areas of the plurality of unit battery cells 2000 thus laminated are adjusted so that the battery capacity of the laminated battery 1000 falls within the predetermined range of value (step S17 of FIG. 5). That is, in the cutting step, on the basis of the respective characteristics of the plurality of unit battery cells 2000 laminated in the laminating step, the plurality of unit battery cells 2000 thus laminated are collectively cut, whereby the areas of the plurality of unit battery cells 2000 thus laminated are adjusted so that the battery capacity of the laminated battery 1000 falls within the predetermined range of value. In this way, the laminated battery 1000 is obtained.

Specifically, in step S16, the battery capacities of the plurality of unit battery cells 2000 laminated in the laminating step are predicted on the basis of battery capacities derived from the respective characteristics of the plurality of unit battery cells 2000 as measured in the measuring step. For example, in the case of manufacture of the series-connected laminated battery 1000, the battery capacities of the plurality of unit battery cells 2000 laminated in the laminating step are predicted by calculating the average of the respective battery capacities of the unit battery cells 2000 laminated in the laminating step.

Further, for example, in the case of manufacture of the parallel-connected laminated battery 1100, the battery capacities of the plurality of unit battery cells 2000 laminated in the laminating step are predicted by calculating the sum of the respective battery capacities of the unit battery cells 2000 laminated in the laminating step.

In step S17, first, the areas of the plurality of unit battery cells 2000 thus laminated are determined on the basis of the battery capacities of the laminated construction of the plurality of unit battery cells 2000 as predicted in step S16 so that the battery capacity of the laminated battery 1000 falls within the predetermined range of value. Then, all of the plurality of unit battery cells 2000 thus laminated are collectively cut, whereby the areas of the plurality of unit battery cells 2000 thus laminated are adjusted so that the areas thus determined are attained. This make it possible to manufacture the laminated battery 1000 with higher battery capacity precision. Further, the collective cutting of a robust cut body obtained by integration of the plurality of unit battery cells 2000 by laminating makes it possible to reduce the occurrence of collapses and internal cracks near a cut surface.

The predetermined range of value of battery capacity is determined by the design of battery capacity of the laminated battery 1000 or other conditions and, for example, is such a range that variations fall within a certain range with respect to the design value of battery capacity of the laminated battery 1000. The predetermined range of value may be a range of ±2.5%, ±1.5%, or ±0.5% of the design value of battery capacity of the laminated battery 1000.

The battery capacity of the laminated battery 1000 is proportional, for example, to the area of the laminated battery 1000. Therefore, for example, as unit battery cells 2000 to be collectively cut, unit battery cells 2000 having such areas that the predicted values battery capacity of a plurality of unit battery cells 2000 laminated is assumed to be greater than the design value of battery capacity of the laminated battery 1000 is fabricated in advance. Then, the areas of the laminated construction of the plurality of unit battery cells 2000 to be cut are determined from the differences between the design value of battery capacity of the laminated battery 1000 and the predicted values of battery capacity of the plurality of unit battery cells 2000 thus laminated. In this case, the plurality of unit battery cells 2000 are collectively cut so that equal areas of the plurality of unit battery cells 2000 are cut. For example, a laminated construction of a plurality of areas Y to be cut is calculated by $Y = X \times (Cp - Cs)/Cp$, where Cs is the design value of battery capacity of the laminated battery 1000, Cp is the predicted values of battery capacity of the plurality of unit battery cell 2000 thus laminated, and X is the areas of the laminated construction of the plurality of unit battery cells 2000 prior to cutting.

A cutting direction of the collective cutting in the cutting step is a direction along the direction of laminating of the plurality of unit battery cells 2000, i.e. a direction perpendicular to a plane of laminating. In this way, the laminated battery 1000 or 1100, shown in FIG. 1 or 3, whose cut surface is parallel with the direction of laminating is formed.

Figure 9:
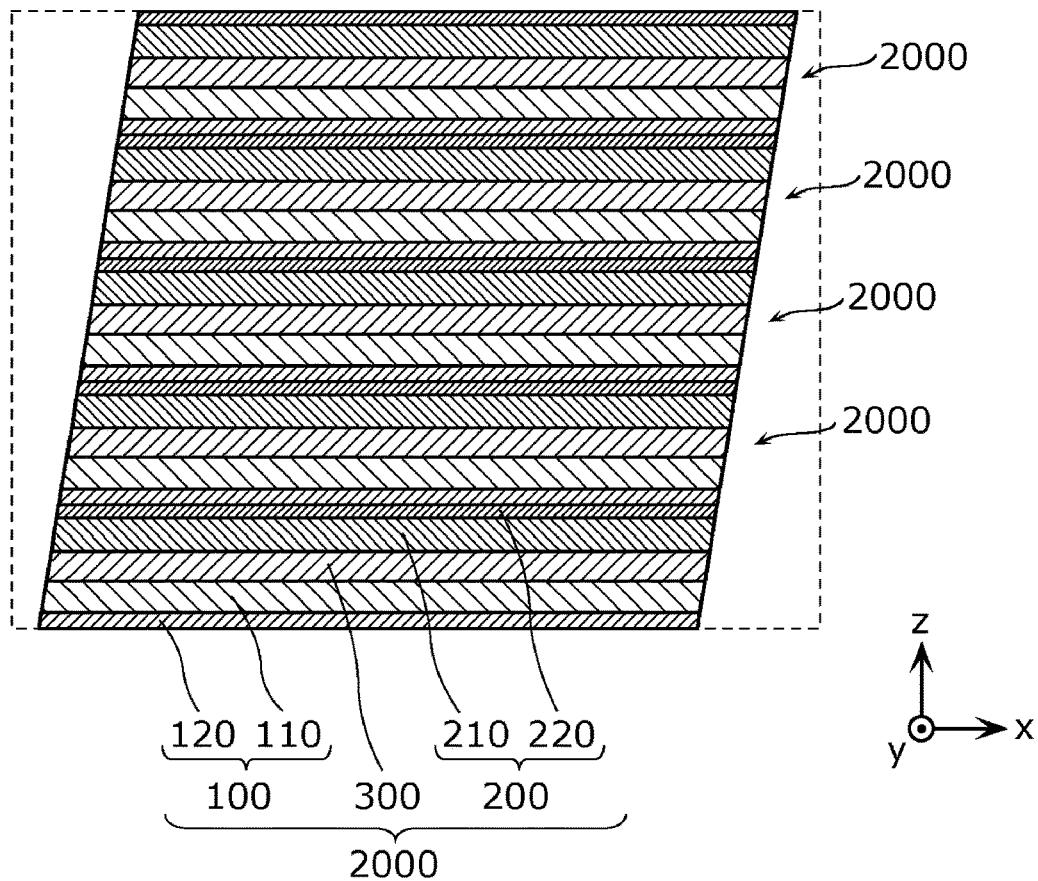
FIG. 9 is a cross-sectional view schematically showing a configuration of a laminated battery formed by oblique collective cutting in a cutting step according to the embodiment.

Further, instead of the method for cutting in a direction perpendicular to the plane of laminating of the plurality of unit battery cells 2000, a method for cutting in a direction oblique to a direction normal to the plane of laminating of a laminated battery may be used. That is, the cutting direction of the collective cutting may be oblique to the direction of laminating of the plurality of unit battery cells 2000. FIG. 9 is a cross-sectional view schematically showing a configuration of a laminated battery 1000B formed by oblique collective cutting in the cutting step according to the embodiment. FIG. 9 uses dashed lines to indicate parts in which the collective cutting took place in the cutting step. As shown in FIG. 9, since the laminated battery 1000B has cut surfaces oblique to a direction normal to the plane of laminating of the laminated battery 1000B, the distances between a negative-electrode layer 100 and a positive-electrode layer 200 on the cut surfaces can be increased. This makes it possible to reduce the risk of short circuits on the cut surfaces. This makes it possible to manufacture the laminated battery 1000B with further enhanced reliability.

Further, such cutting in an oblique direction is longer in distance of cutting than cutting in a direction perpendicular to the plane of laminating and therefore tends to cause each layer, for example, to peel and fall. In the manufacturing method according to the present embodiment, the collective cutting of an integrated robust cut body such as a laminated construction of unit battery cells 2000 makes it harder for each layer, for example, to collapse or internally crack than the cutting of a single unit battery cell 2000. Therefore, the manufacturing method according to the present embodiment is particularly helpful.

Further, as shown in FIG. 9, for example, in the case of oblique collective cutting, the cutting takes place in the two parts in a direction oblique to the direction of laminating. Further, the collective cutting takes place so that the two parts have cut surfaces parallel to each other. In this way, the respective areas of the plurality of unit battery cells 2000 thus laminated are kept equal.

It should be noted that the two parts do not need to have cut surfaces parallel to each other, and oblique collective cutting may take place in only one part. For example, in the laminating step, the plurality of unit battery cells 2000 are laminated on the basis of battery capacities derived from the respective characteristics of the plurality of unit battery cells 2000 as measured in the measuring step so that the battery capacities of the unit battery cells 2000 as derived in the measuring step increase or decrease. Then, oblique collective cutting takes place so that a high-battery-capacity unit battery cell 2000 is smaller in area after the cutting. This makes it possible to reduce the differences in battery capacity among the plurality of unit battery cells 2000, making it possible to further enhance the reliability of a laminated battery.

Figure 10A:
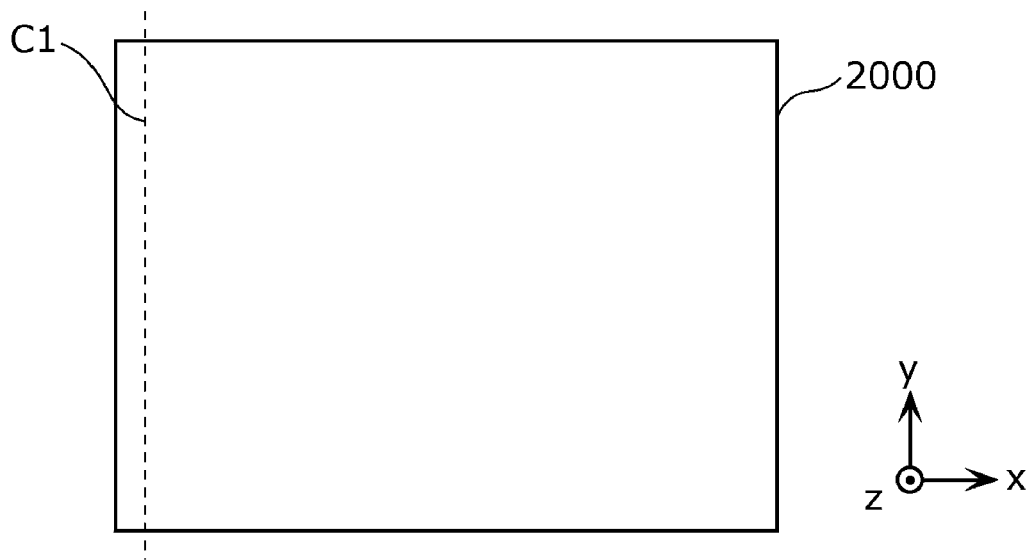
FIG. 10A is a plan view for explaining an example of a site of cutting of a laminated configuration of unit battery cells according to the embodiment.
Figure 10B:
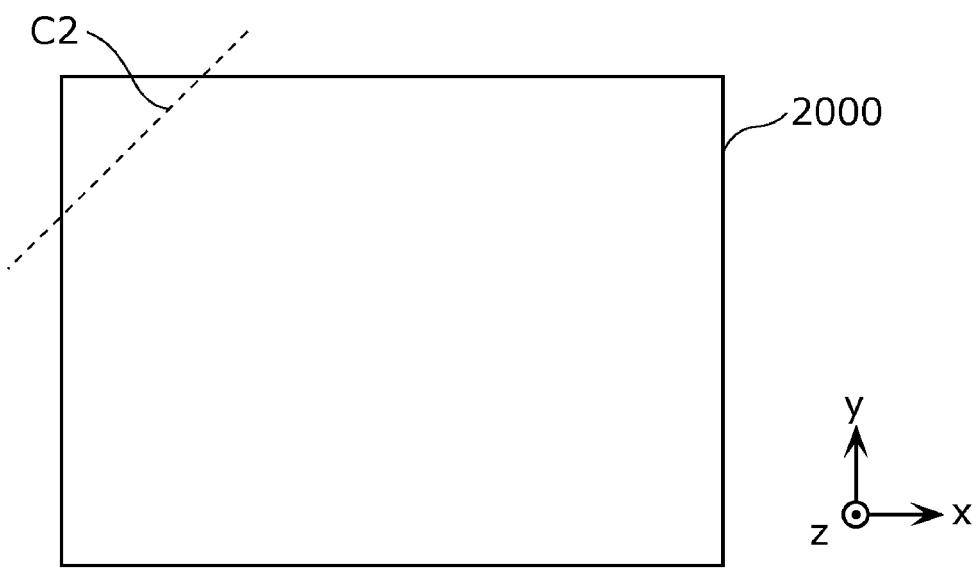
FIG. 10B is a plan view for explaining an example of a site of cutting of a laminated configuration of unit battery cells according to the embodiment.

FIGS. 10A and 10B are each a plan view for explaining an example of a site of cutting of a laminated construction of unit battery cells 2000. As shown in FIG. 10A, for example, the unit battery cells 2000 laminated in the laminating step are cut along a dashed line C1 parallel to one side of the rectangular unit battery cell 2000 in plan view. Alternatively, as shown in FIG. 10B, the unit battery cells 2000 laminated in the laminating step may be cut along a dashed line C2 passing through two orthogonal sides of the unit battery cell 2000 in plan view so that the part to be cut includes a corner of the unit batter cell 2000. Cutting along the dashed line C2 removes the corner of the unit battery cell 2000, which is susceptible to external shock, thus making it possible to enhance the reliability of the laminated battery 1000. Further, even in a case where the unit battery cell 2000 is cut by a small area, it is not necessary to remove a thin and long region as in the case of cutting along a side of the unit battery cell 2000 in plan view, so that cutting can be easily done. Although, in the illustrated example, only one part is cut, a plurality of parts may be cut.

Usable examples of collective cutting methods include shear cutting, score cutting, razor cutting, ultrasonic cutting, laser cutting, jet cutting, or other various cutting methods. Further, the shear cutting involves the use of any of various cutting blades such as a gable slit blade, a gang slit blade, a rotary chopper blade, or a shear blade. Further, the collective cutting may involve the use of a Thomson blade.

Further, after the collective cutting, the plurality of unit battery cells 2000 thus laminated may be compressed in the direction of laminating. This makes it possible to increase the battery capacity and volume energy density of the laminated battery 1000.

Finally, if necessary, the laminated battery thus obtained is fitted with leads, a sealing member, a jacket, or other components in a step of finishing the laminated battery (step S18 of FIG. 5). It should be noted that the laminated battery may be further compressed after step S18.

As noted above, a method for manufacturing a laminated battery according to the present embodiment is a method for manufacturing a laminated battery 1000 in which a plurality of unit battery cells 2000 each having a negative-electrode layer 100, a positive-electrode layer 200, and a solid electrolyte layer 300 located between the negative-electrode layer 100 and the positive-electrode layer 200 are laminated. The method for manufacturing a laminated battery 1000 includes a measuring step, a laminating step, and a cutting step. In the measuring step, the respective characteristics of the plurality of unit battery cells 2000 are measured. In the laminating step, the plurality of unit battery cells 2000 the characteristics of which have been measured in the measuring step are laminated. In the cutting step, on the basis of the respective characteristics of the plurality of unit battery cells laminated in the laminating step, the plurality of unit battery cells thus laminated are collectively cut, whereby areas of the plurality of unit battery cells thus laminated are adjusted so that a battery capacity of the laminated battery falls within a predetermined range of value.

This makes it possible to measure the respective characteristics of the unit battery cells 2000 of the laminated battery 1000 prior to the laminating step and predict, for example, on the basis of the characteristics thus measured, the battery capacities of the plurality of unit battery cells 2000 laminated in the laminating step. This in turn makes it possible to precisely adjust the battery capacities by adjusting the area of the laminated battery 1000, which is proportional to the battery capacity of the laminated battery 1000, by collectively cutting the plurality of unit battery cells 2000 thus laminated. This in turn makes it possible to increase the battery capacity precision of the laminated battery 1000. Further, in the cutting step, the collective cutting of a robust cut body obtained by integration of the plurality of unit battery cells 2000 by laminating makes it possible to reduce the occurrence of collapses and internal cracks near a cut surface. This makes it possible to enhance the reliability of the laminated battery 1000. Further, the collective cutting can make the number of cuttings much smaller than the individual cutting of each of the plurality of unit battery cells 2000. This brings about improvement in producibility of the laminated battery 1000.

Further, in a case where cutting is carried out again to adjust the area for the purpose of adjusting the battery capacity, there tends to be deterioration in cut surface quality, as the amount of adjustment is so small that the ratio of the thickness of the cut body to the cutting width is too high. In the manufacturing method according to the present embodiment, a site of cutting of the laminated battery can be accurately determined, as the areas of the plurality of unit battery cells 2000 laminated in the laminating step are adjusted on the basis of characteristics measured in advance. This results in making it unnecessary to carry out cutting again with a small amount of adjustment, making it possible to improve the cut surface quality of the laminated battery 1000.

Therefore, the method for manufacturing a laminated battery according to the present embodiment makes it possible to manufacture the laminated battery 1000 with enhanced reliability with high producibility.

OTHER EMBODIMENTS

In the foregoing, a laminated battery according to the present disclosure has been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

For example, although, in the foregoing embodiment, the laminated battery is a series-connected or parallel-connected laminated battery, this is not intended to impose any limitation. The laminated battery may be a combination of series-connected and parallel-connected laminated batteries laminated such that the positive-electrode or negative electrode layers of the series-connected laminated battery are electrically connected to each other.

Further, although, in the foregoing embodiment, the plurality of unit battery cells are separately formed by laminating and compressing layers of each of the unit battery cells, this is not intended to impose any limitation. For example, the plurality of unit battery cells may be formed by forming a unit battery cell of a size that can be divided into two or more and dividing the unit battery cell.

Further, the foregoing embodiments are subject, for example, to various changes, substitutions, additions, and omissions in the scope of the claims or the scope of equivalents thereof.

A laminated battery according to the present disclosure may be used as a battery for an electronic device, an electrical appliance, and an electric vehicle.

What is claimed is:

1. A method for manufacturing a laminated battery in which comprising:
    forming a plurality of unit battery cells each having a negative-electrode layer, a positive-electrode layer, and a solid electrolyte layer located between the negative-electrode layer and the positive-electrode layer are laminated, wherein each unit battery cell of the plurality of unit battery cells is formed by laminating the solid electrolyte layer between the negative-electrode layer and the positive-electrode layer;
    measuring characteristics of each unit battery cell of the plurality of unit battery cells, where the measured characteristics are electrical or mechanical characteristics of each unit battery cell of the plurality of unit battery cells, and correlating the measured characteristics of each unit battery cell with a battery capacity of each unit battery cell of the plurality of unit battery cells;
    after the characteristics of each unit battery cell of the plurality of unit battery cells has been measured, selecting at least some of the unit battery cells of the plurality of unit battery cells and forming a laminated battery having a battery capacity that falls within a predetermined range by laminating the selected unit battery cells; and
    on the basis of the measured characteristics of the unit battery cells that form the laminated battery, adjusting areas of the unit battery cells that form the laminated battery by collectively cutting all of the unit battery cells that form the laminated battery so that a difference in battery capacity between each of the unit battery cells that form the laminated battery is less than or equal to 5%, wherein
    a cutting direction of the collective cutting is a direction of the laminating of the selected unit battery cells to form the laminated battery or is oblique to the direction of the laminating of the selected unit battery cells to form the laminated battery.

2. The method according to claim 1, wherein the characteristics of each unit battery cell of the plurality of unit battery cells that has been measured prior to forming the laminated battery are charge and discharge characteristics of each unit battery cell of the plurality of unit battery cells.

3. The method according to claim 2, wherein the charge and discharge characteristics are measured in a region lower than or equal to 10% of the battery capacities of each unit battery cell of the plurality of unit battery cells.

4. The method according to claim 2, wherein a duration of measurement of the charge and discharge characteristics is shorter than or equal to one minute.

5. The method according to claim 1, wherein the characteristics of each unit battery cell of the plurality of unit battery cells that has been measured prior to forming the laminated battery are impedances of each unit battery cell of the plurality of unit battery cells.

6. The method according to claim 1, wherein the unit battery cells that form the laminated battery are electrically connected in series to one another.

7. A method for manufacturing a laminated battery comprising:
    forming a plurality of unit battery cells each having a negative-electrode layer, a positive-electrode layer, and a solid electrolyte layer located between the negative-electrode layer and the positive-electrode layer, wherein each unit battery cell of the plurality of unit battery cells is formed by laminating the solid electrolyte layer between the negative-electrode layer and the positive-electrode layer;
    measuring charge and discharge characteristics or impedances characteristics of each unit battery cell of the plurality of unit battery cells;
    after the charge and discharge characteristics or impedances characteristics of each unit battery cell of the plurality of unit battery cells has been measured, laminating each unit battery cell of the plurality of unit battery cells to form a laminated battery; and
    on the basis of the measured charge and discharge characteristics or the measured impedances characteristics of each unit battery cell that forms the laminated battery, adjusting areas of each unit battery cell that forms the laminated battery by collectively cutting all of the unit battery cells that form the laminated battery so that a difference in battery capacity between each of the unit battery cells that form the laminated battery is lower than or equal to 5%, wherein
    a cutting direction of the collective cutting is a direction of the laminating of each unit battery cell of the plurality of unit battery cells to form the laminated battery or is oblique to the direction of the laminating of each unit battery cell of the plurality of unit battery cells to form the laminated battery.

8. A method for manufacturing a laminated battery comprising:
forming a plurality of unit battery cells each having a negative-electrode layer, a positive-electrode layer, and a solid electrolyte layer located between the negative-electrode layer and the positive-electrode layer, wherein each unit battery cell of the plurality of unit battery cells is formed by laminating the solid electrolyte layer between the negative-electrode layer and the positive-electrode layer;
measuring a capacity of each unit battery cell of the plurality of unit battery cells;
after the capacity of each unit battery cell of the plurality of unit battery cells has been measured, laminating each unit battery cell of the plurality of unit battery cells to form a laminated battery; and
on the basis of the measured capacity of each unit battery cell of the plurality of unit battery cells that forms the laminated battery, adjusting areas of each unit battery cell that forms the laminated battery by collectively cutting all the unit battery cells that form the laminated battery so that a difference in battery capacity between each of the unit battery cells that form the laminated battery is lower than or equal to 5%, wherein
a cutting direction of the collective cutting is a direction of the laminating of each unit battery cell of the plurality of unit battery cells to form the laminated battery or is oblique to the direction of the laminating of each unit battery cell of the plurality of unit battery cells to form the laminated battery.

9. The method according to claim 7, wherein each unit battery cell of the plurality of unit battery cells that form the laminated battery are electrically connected in series to one another.

10. The method according to claim 8, wherein each unit battery cell of the plurality of unit battery cells that form the laminated battery are electrically connected in series to one another.

* * * * *